Sept. 28, 1965    R. H. SMITH ETAL    3,208,656
STRAND INDEXING APPARATUS
Filed Jan. 28, 1963
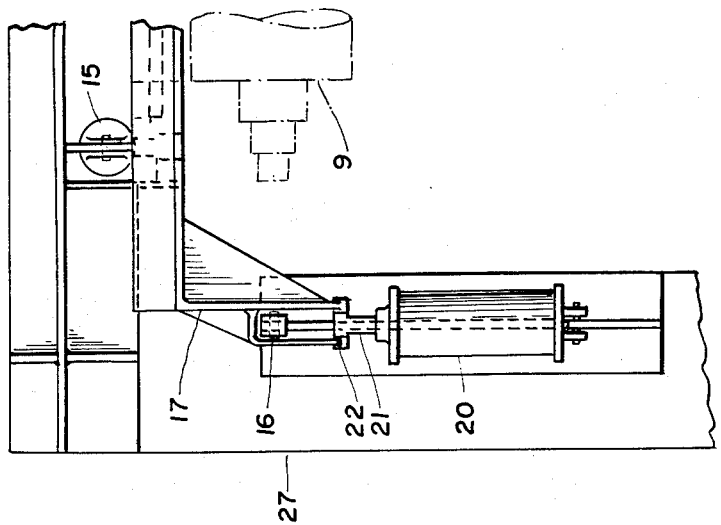
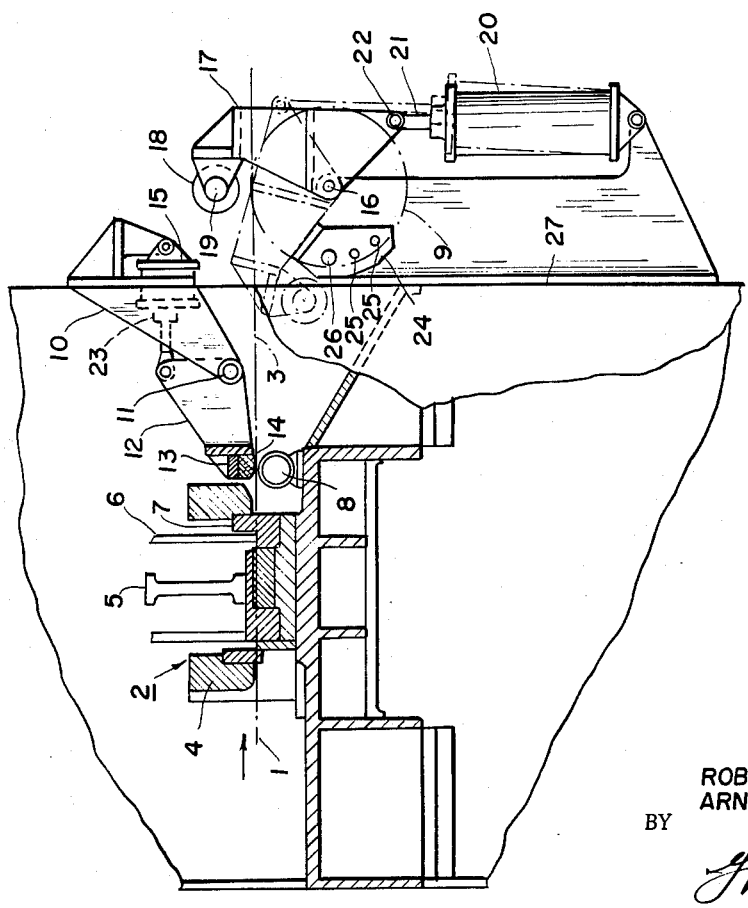
INVENTORS
ROBERT H. SMITH and
ARNOLD G. SHUMAKER
BY
*JR Harris*
their ATTORNEY United States Patent Office 3,208,656
Patented Sept. 28, 1965

3,208,656
STRAND INDEXING APPARATUS
Robert H. Smith, Sewickley, and Arnold G. Shumaker, Monaca, Pa., assignors to Jones & Laughlin Steel Corporation, Pittsburgh, Pa., a corporation of Pennsylvania
Filed Jan. 28, 1963, Ser. No. 254,836
4 Claims. (Cl. 226—195)

This invention relates to apparatus for indexing a strand of material which normally moves continuously through a processing line. It is more particularly concerned with apparatus for indexing a cut or sheared end of such a strand which is thus not under the tension normally maintained in the strand by the processing apparatus.

Our invention will be described hereinafter in connection with the processing of metal strip, such as steel strip for tinplate or the like, and particularly with respect to indexing the ends of successive strips for subsequent joining together by welding or the like. Our invention, however, is not limited to steel strip or metallic strip, but is applicable to any material which is conventionally processed in strand form through machines arranged in succession to constitute a processing line.

Steel strip to be electrotinned is conventionally passed continuously through successive operations such as cleaning, pickling, washing, and electrotinning. The strip is supplied to the processing line as a coil and is uncoiled at the entry end of the line, passed through the line, and then coiled, or sometimes sheared into sheets, at the discharge end of the line. It is therefore customary to attach the leading end of a succeeding coil of strip to the trailing end of the previous coil of material before that trailing end passes through the processing line; otherwise, it would be necessary to thread the leading end of the new coil through the entire line, which is normally a tedious operation. In electrotinning lines it is conventional to shear the trailing end of a coil when that end reaches the entry end of the processing line, shear the leading end of the next coil, overlap the two ends a predetermined amount, and weld them together, so that the trailing end pulls the leading end of the succeeding coil through the line. The overlapped section of the strip containing the weld is necessarily thicker than the strip alone. To minimize the effect of that extra thickness on the processing apparatus, and to reduce scrap loss, it is desirable to minimize the overlapped area. This means that the extent of overlap between the ends of the strip to be welded must be quite carefully controlled.

It is an object of our invention, therefore, to provide apparatus for moving a strand of material a closely controlled predetermined amount. It is another object to provide such apparatus for indexing a cut end of a flexible strand which is not otherwise under tension. It is another object of our invention to provide such apparatus which requires minimum space in a continuous strand processing line. Other objects of our invention will occur in the course of the description thereof which follows.

An embodiment of our apparatus presently preferred by us is illustrated in the attached figures to which reference is now made.

FIGURE 1 is an elevation partly in cross section of apparatus of our invention shown in conjunction with known strip welding apparatus.

FIGURE 2 is a partial section of the apparatus of FIGURE 1.

In FIGURE 1 the leading end 1 of a coil of steel strip is shown in welding apparatus designated generally by the reference character 2. In that apparatus it overlaps the trailing end 3 of strip passing through processing apparatus, not shown. The direction of strip travel is from left to right in FIGURE 1, as is indicated by the arrow. As welding apparatus 2 is conventional and in itself forms no part of our invention, we describe it only to the extent required to explain our invention. At the entry side of welding mechanism 2 is located a shear 4. Retractable clamping apparatus 5 is provided to clamp the leading end 1 of the new coil of strip. Spaced from clamp 5 in the direction of travel of the strip is a welding wheel 6, and spaced immediately adjacent wheel 6 in the direction of strip travel is a retractable stop 7. The strip 3 leaving the welder mechanism 2 passes over a freely-rotating roll 8 which is spaced from stop 7, and from roll 8 passes over a considerably larger diameter freely-rotating roll 9 which is spaced from roll 8.

Positioned above the line of travel of strip 3 and attached to structural member 27 is bracket 10 and pivoted thereto about a horizontal axis 11 croswise of the strip is arm 12. Arm 12 carries at its outer end a transverse bar 13 positioned above idler roll 8 and having an undersurface 14 of frictional material such as brake lining. An air cylinder 15 mounted on bracket 10 has its piston 23 attached to arm 12 at a point above the pivot axis 11. Roll 9 rotates about an axis 16 transverse to the path of travel of the strip. A pair of arms 17 are mounted to pivot around axis 16, one at each end of roll 9. In the outer ends of arm 17 is journaled an indexing roll 18 which is freely rotatably around its axis 19. Roll 18 is mounted crosswise of strip 3. An air cylinder 20 is vertically mounted on structural member 27 below the path of strip 3 with its piston 21 attached pivotally to arms 17 at a pivot 22 which is offset from axis 16 of roll 9. Operation of air cylinder 20 causes arms 17 to pivot around axis 16 so that roll 18 moves from a position above the path of travel of strip 3 to a position below that path of travel and toward welding mechanism 2, as is shown in broken lines in FIGURE 1. A vertical plate 24 is attached to structural member 27 adjacent the path of travel of arm 17, and is provided with a plurality of holes 25—25. An outwardly projecting pin 26 is placed in one or another of the holes 25—25 and stops the movement of arm 17.

The operation of our apparatus will be explained in connection with the embodiment of our apparatus which we have described. When the trailing end 3 of strip passing through the processing line approaches shear 4, the strip is stopped, and sheared off square by operation of shear 4. A predetermined overlap of this shear end of strip 3 with that of the leading end 1 of the strip from the new coil is desired, and this requires that the sheared end of strip 3 be precisely positioned with respect to welding wheel 6. To maintain strip 3 under tension while it is being overlapped, air is admitted to cylinder 15 which forces piston 21 to the left in FIGURE 1, and causes arm 12 to pivot counter-clockwise. The frictional material 14 carried by bar 13 is thereby forced against strip 3 in the area where it passes over roll 8. Air is then admitted to air cylinder 20 which forces piston rod 21 upwardly, causing arms 17—17 to pivot counter-clockwise about axis 16. This movement of arms 17 brings roll 18 carried thereby into contact with strip 3, and as roll 18 travels around the surface of roll 9, strip 3 is depressed below its normal path of travel. The result of this is that the sheared trailing end of strip 3 is pulled toward the right FIGURE 1 an amount determined by the travel of roll 18 around roll 9. This travel is adjusted to the desired amount by placing pin 26 in the proper hole 25 of plate 24. While strip 3 is pulled in the manner above described, it is held under tension between the frictional element 14 and roll 8 so that the travel of its sheared end is precisely that resulting from the travel of roll 18.

When the sheared end of strip 3 is properly positioned as we have described, stop element 7 is lowered onto strip 3. The leading end of strip 1 is sheared by shear 4, and is moved up against stop 7 to form the desired overlap for welding. Strip 1 is clamped in place by clamp 5, and welding is carried out in the usual way. Clamp 5 and stop 7 are then retracted, crossarm 13 is raised, and roll 18 is moved back to its original position above the path of travel of strip 3. Strip 3 is caused to move through the processing line, pulling strip 1 after it.

We claim:

1. Apparatus for indexing an end of a traveling strand comprising an idler roll positioned transversely below the path of travel of the strand, a frictional member positioned over the idler roll immediately above the path of travel of the strand, means for moving the frictional member toward the idler roll against the strand to increase tension therein, a surface extending transversely of the path of travel of the strand and downwardly away from that path positioned immediately below that path and spaced from the idler roll in the direction of strand travel, an indexing roll positioned transversely of the path of travel of the strand and means for moving that roll from an initial position above the path of travel of the strand and above the surface downwardly along the surface to a final position transversely of and below the path of travel of the strand.

2. Apparatus of claim 1 in which the surface is a freely rotatable cylindrical roll.

3. Apparatus of claim 1 in which the surface is a cylindrical roll and the means for moving the indexing roll is a pair of arms mounted at one end to pivot about the axis of the cylindrical roll, and having the indexing roll journaled in the other end.

4. Apparatus of claim 1 in which the frictional member is a rigid bar.

References Cited by the Examiner

UNITED STATES PATENTS

| 925,949 | 6/09 | Rolland | 242—75.3 |
| 1,718,225 | 6/29 | Funk | 226—193 X |
| 1,972,902 | 9/34 | Potdevin | 226—195 X |
| 2,115,737 | 5/38 | Menschner | 242—75.3 X |
| 3,048,346 | 8/62 | Karber | 242—75.3 |

FOREIGN PATENTS 511,959   11/30   Germany.

ROBERT B. REEVES, *Acting Primary Examiner.*

RAPHAEL M. LUPO, *Examiner.*